United States Patent
Khojasteh et al.

(10) Patent No.: US 9,985,731 B1
(45) Date of Patent: May 29, 2018

(54) POWER CABLES WITH INTEGRATED WIRELESS COMMUNICATION COMPONENTS

(71) Applicant: Amazon Technologies, Inc., Seattle, WA (US)

(72) Inventors: Kamran Khojasteh, Morgan Hill, CA (US); Robert Niemand, Morgan Hill, CA (US); Allen Bettner, Soquel, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days. days.

(21) Appl. No.: 15/400,362

(22) Filed: Jan. 6, 2017

(51) Int. Cl.
| | |
|---|---|
| H04N 5/225 | (2006.01) |
| H04B 15/02 | (2006.01) |
| H04B 7/26 | (2006.01) |
| H01B 7/04 | (2006.01) |
| H01B 11/02 | (2006.01) |
| H01B 11/00 | (2006.01) |

(52) U.S. Cl.
CPC ............. *H04B 15/02* (2013.01); *H01B 7/041* (2013.01); *H01B 11/002* (2013.01); *H01B 11/02* (2013.01); *H04B 7/26* (2013.01)

(58) Field of Classification Search
CPC .... H04N 5/2228; H04N 5/2252; H04N 7/106; H04N 7/186; G03B 17/561; G03B 17/568
USPC .................................. 348/373–374; 455/572
See application file for complete search history.

(56) References Cited

U.S. PATENT DOCUMENTS

| | | | |
|---|---|---|---|
| 2009/0167494 A1* | 7/2009 | Martins ................ | G01R 21/133 340/10.1 |
| 2010/0085144 A1* | 4/2010 | Aisa .................... | G05B 19/0423 340/3.1 |
| 2011/0133865 A1* | 6/2011 | Miller, II ................ | H01P 3/06 333/24 R |
| 2011/0276289 A1* | 11/2011 | Park ..................... | G01R 21/133 702/62 |
| 2012/0022348 A1* | 1/2012 | Droitcour ............ | A61B 5/0507 600/323 |
| 2012/0028488 A1* | 2/2012 | Puschnigg .............. | G06F 1/266 439/189 |
| 2012/0109398 A1* | 5/2012 | Bhakta ....................... | H02J 3/14 700/295 |
| 2015/0084433 A1* | 3/2015 | Shah ......................... | H02J 3/24 307/112 |
| 2015/0304613 A1* | 10/2015 | Child ..................... | H04N 7/183 348/143 |
| 2015/0326317 A1* | 11/2015 | Michaelis ............ | H04B 10/807 398/115 |
| 2016/0330825 A1* | 11/2016 | Recker ................ | H05B 37/0272 |
| 2017/0105272 A1* | 4/2017 | Johnson .............. | H05B 37/0263 |
| 2017/0179608 A1* | 6/2017 | Henry ....................... | H01Q 13/24 |
| 2018/0013934 A1* | 1/2018 | Germe .................... | G03B 17/561 |

* cited by examiner

*Primary Examiner* — Simon Nguyen
(74) *Attorney, Agent, or Firm* — Eversheds Sutherland (US) LLP

(57) ABSTRACT

Systems, methods, and computer-readable media are disclosed for power cords with integrated wireless communication components. In one embodiment, an example power cable may include a first portion having a first connector, a second portion having a second connector, and an integrated radio module with a ZigBee radio. The integrated radio module may be coupled between the first portion and the second portion.

20 Claims, 6 Drawing Sheets

POWER CABLES WITH INTEGRATED WIRELESS COMMUNICATION COMPONENTS

BACKGROUND

Electronic devices may include components for wireless communication. For example, smartphones may include components to communicate data both through a WiFi network connection, as well as through a cellular network connection. In some instances, certain wireless communications may cause interference with other wireless communications, or data and/or bandwidth loss may occur as a result of electronic interference. Some devices may use shields or other components to decrease interference or improve communication. However, in some instances, additional components for wireless communication may be needed, without an increase in interference and/or data transmission errors.

Figure 1:
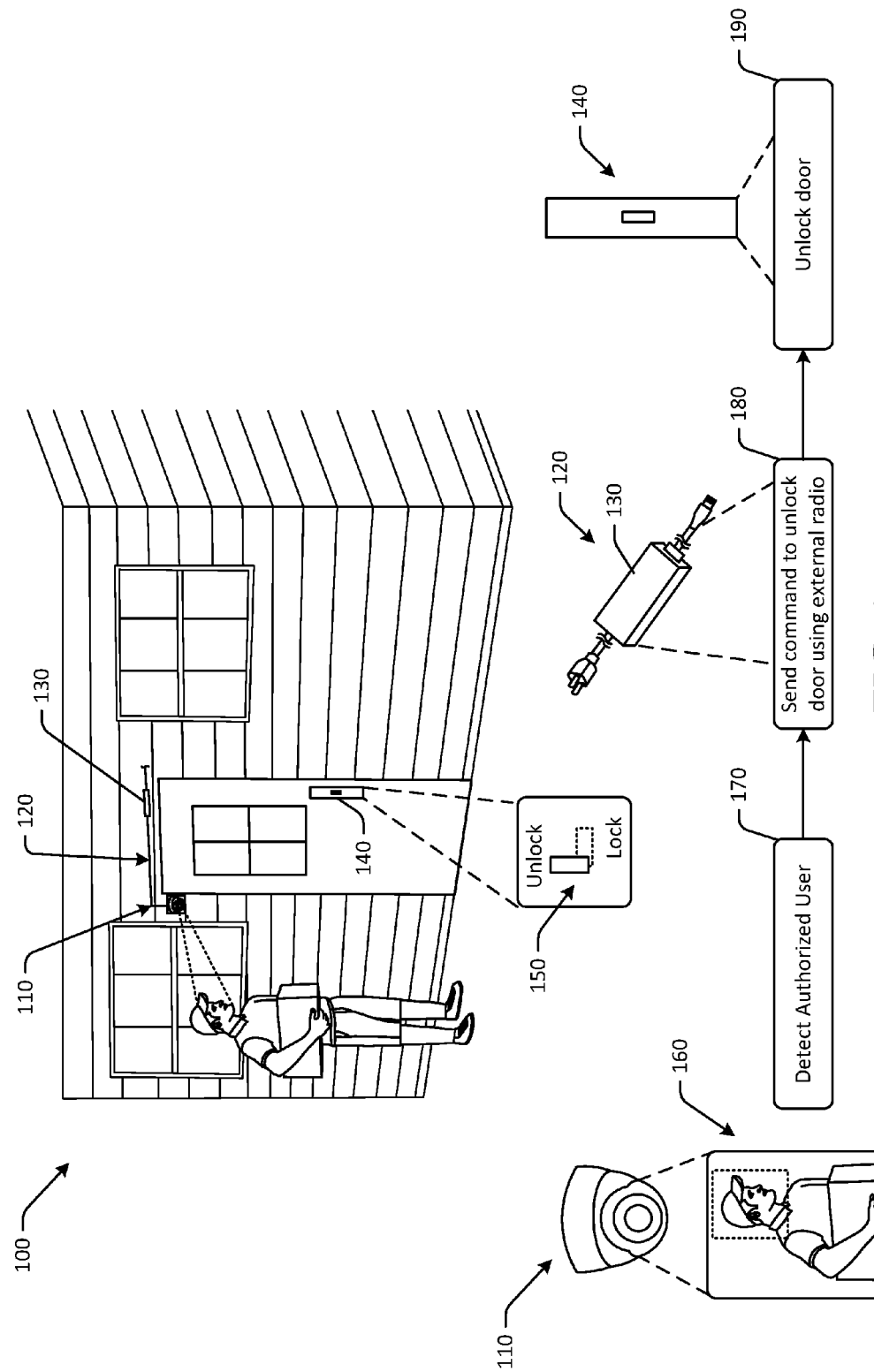
FIG. 1 is an example use case of an electronic device with a power cable with an integrated wireless communication component in communication with an electronic door lock in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be used to wirelessly send and receive data. For example, certain electronic devices, such as smartphones, tablets, laptop computers, and other mobile devices, may include one or more components that can be used to wirelessly communicate over one or more networks. In one example, a smartphone may include a WiFi radio for wireless communication over a WiFi network, as well as a cellular network radio or transceiver for wireless communication over one or more cellular networks. Some networks may use certain frequencies, bandwidths, or have other configurations, and may have certain coverage. For example, a Bluetooth radio may be used by an electronic device for wireless communication over a Bluetooth network that has a limited range, or a range that is less than, for example, a WiFi network. In another example, an electronic device may include a ZigBee radio used for wireless communication over a ZigBee network that may have a network coverage or network range that is relatively smaller than other networks.

Use of multiple components for wireless communication and/or wireless networks within a device may create interference in the airspace about an electronic device, which may cause reduced data through-put, increased transmission errors, and/or reduced communication efficiency. For example, if multiple wireless radios or other components are sending and/or receiving data at the same time in a similar RF band like ISM, and are in a similar location, the respective streams of data may interfere with each other. Such interference may cause data packet errors and other issues.

To reduce interference between components for wireless communication, embodiments of the disclosure include power cords with integrated wireless communication components, such as wireless radios, that can be coupled to electronic devices. The power cords or cables with integrated wireless communication components can allow the electronic device to communicate wirelessly using the integrated wireless communication component, while reducing interference due to a physical distance or separation between the integrated wireless communication component in the power cord and other wireless communication components or radios in the electronic device itself.

By positioning one or more wireless communication components external to an electronic device and creating separation between the external wireless communication component and any wireless communication components internal to the electronic device, embodiments of the disclosure may reduce potential interference between the external and internal wireless communication components. As a result, data transmission rates may be improved, data packet errors and transmission errors may be reduced, and functionality of the electronic device may be improved, due to the additional functionality provided by the external wireless communication component that may be integrated into a power cord for the electronic device. For example, an electronic device, such as a monitoring camera that includes an internal WiFi radio or component may be able to communicate using a ZigBee radio that is integrated into a power cord for the camera. Without the integrated ZigBee radio in the power cord, the camera may otherwise be unable to communicate or communicate effectively over a ZigBee network.

This disclosure relates to, among other things, systems, methods, computer-readable media, techniques, and methodologies for power cables with integrated wireless communication components. Embodiments may include wireless radios and other components that are integrated into power cords. Such embodiments may reduce interference between wireless radios in a system, improve data transmission, and expand functionality of devices.

Referring to FIG. 1, an example environment 100 with an electronic device coupled to a power cable with an integrated wireless communication component in communication with an electronic door lock is illustrated in accordance with one or more embodiments of the disclosure. In the example of FIG. 1, a camera device 110 may be positioned at an entryway, such as a front door of a residence, apartment building, or other location.

The camera device 110 may be coupled to a power cord 120 with an integrated wireless communication component 130. The power cord 120 may be configured to deliver power to the camera device 110. The power cord 120 may be a universal serial bus (USB) power cable that allows for direct communication between the camera system 110 and the wireless communication component 130. In some embodiments, the power cord 120 may be the same or different on either side of the wireless communication component 130. For example, the power cord 120 may be a micro-USB cord with five wires between the camera device 110 and the wireless communication component 130, and the power cord 120 may be a USB Type A cord with four wires between the wireless communication component 130 and a power source. In some embodiments, there may be no data path between the power source and the wireless communication component 130. Other embodiments may have different wires and/or configurations. Some embodiments may have the same wires on both sides of the wireless communication component 130. The power cord 120 may be about ten feet long, or any other length, and may include one or more connectors. For example, the power cord 120 may include a USB Type A connector at one end and a micro-USB connector at another end. A length of the power cord 120 between the camera device 110 and the wireless communication component 130 may be about one meter, ten feet, or any other length. In some embodiments, the length between an electronic device connected to the power cord and the wireless communication component 130 may be equal to or greater than a threshold length, such as about 6 inches, about one foot, or another threshold length. The threshold length may be used to create physical separation or distance between the wireless communication component 130 and an electronic device, or a radio within the electronic device.

The wireless communication component 130 may be integrated into the power cord 120. For example, the wireless communication component 130 may be soldered, removably coupled, or otherwise attached and/or detachable to one or more wires that forms the power cord 120. The wireless communication component 130 may be encapsulated in an outer layer of the power cord 120. The wireless communication component 130 may be positioned within a continuous housing of, or molded into, the power cord 120. The wireless communication component 130 may be connected to one or more of the wires in the power cord 120 in a series connection. The wireless communication component 130 may be a component configured to send and/or receive wireless communications. For example, the wireless communication component 130 may be a radio, such as a WiFi radio, a ZigBee (802.15) radio, a Bluetooth or Bluetooth LE radio, or another wireless communication component.

The camera device 110 may be configured to monitor the area near the doorway. For example, the camera device 110 may include one or more motion sensors or other sensors that activate a camera system when motion is detected near the doorway. The camera device 110 may include one or more internal wireless communication components. For example, the camera system 110 may include a WiFi radio for wireless communication over a WiFi network, as well as a Bluetooth radio for wireless communication over a Bluetooth network, such as to communicate with internet of things devices. The WiFi radio and the Bluetooth radio may generate interference about the camera system 110 due to incoming or outgoing communications, such as beacons, requests, and other data. In other embodiments, the camera device 110 may include additional, fewer, or different wireless communication components.

An electronic door lock 140 may be positioned at the door in the environment 100. The electronic door lock 140 may include a ZigBee or Z-wave radio for wireless communication over a ZigBee network. The electronic door lock 140 may be configured to automatically lock and/or unlock the door 150 in response to instructions received over a ZigBee network. For example, a user may be able to remotely lock or unlock the door using the electronic door lock 140 by sending lock or unlock instructions to the electronic door lock 140 over a ZigBee network using a user device. In other embodiments, the electronic door lock 140 may be configured to communicate and/or receive instructions over a different type of network (e.g., WiFi, Bluetooth, etc.).

The camera device 110 may be configured to monitor the doorway area for people or for other items, and, in some instances, to automatically unlock or lock the electronic door lock 140. For example, the camera device 110 may be configured to identify owners of the residence to which the door provides access, mail or package delivery personnel, certain types of devices or tokens, and other people or devices. For example, the camera device 110 may detect motion and activate a camera system. A feed from the camera system may be communicated to one or more remote servers for facial recognition services to be performed. The feed may be communicated over a WiFi network or another wireless connection. If a person in the feed is recognized and/or authorized, the camera device 110 may unlock the electronic door lock 140 for that person. In another example, the camera device 110 may detect the presence of a certain device, such as an electronic key, and may unlock or lock the electronic door lock 140. For example, a UPS deliveryman may either be facially recognized or may possess an electronic key, and as the UPS deliveryman approaches the door, the camera device 110 may cause the electronic door lock 140 to be unlocked, so as to allow the UPS deliveryman to enter the residence and deliver the package. In another example, the delivery agent may authenticate credentials with a cloud service using the camera device 110, using a mobile application through a cellular network or other network, or using another device and network. In some embodiments, the camera device 110 may be indoors.

However, the camera device 110 may not include an internal ZigBee radio or component that can be used to communicate with the electronic door lock 140. Including the ZigBee radio internally may increase interference and result in data errors for one or more of the internal WiFi and Bluetooth radio components of the camera device 110. Specifically, ZigBee may use the same fixed-channel 2.4 GHz radio as the WiFi radio, with nearly non-deterministic access time slots. As a result, predicting when a ZigBee network needs a data packet or access to a local node may be difficult. Further, if the ZigBee radio and WiFi radios are too close, the radios may compress each other, thereby reducing each radio's radio frequency sensitivity. In addition, ZigBee may communicate longer data packets than Bluetooth LE, and may occupy more airtime, which may increase complexities of coexistence between ZigBee, WiFi and Bluetooth LE radios.

The power cord 120 that is coupled to the camera device 110 may include the wireless communication component 130. The wireless communication component 130 may be a ZigBee radio component. The camera device 110 may be configured to communicate with the electronic door lock 140, or another ZigBee-based device, using the wireless communication component 130 of the power cord 120. Because the wireless communication component 130 is physically separated from the camera device 110, the wireless communication component 130 may not increase interference in the airspace about the camera device 110 or internal to the camera device 110. In addition, communications sent or received at the wireless communication component 130 may not be affected by interference caused by wireless components internal to or adjacent the camera device 110.

The camera system 110 may communicate with the wireless communication component 130 via, for example, a universal asynchronous receiver/transmitter. The universal asynchronous receiver/transmitter may be a device used for asynchronous serial communication. The data format and transmission speeds between the camera system 100 and the wireless communication component 130 may be adjustable. In other embodiments, USB2.0 or another protocol may be used for communication between the camera device 110 and the wireless communication component 130. In such embodiments, the camera device 110 may include a USB On-the-Go hub.

FIG. 1 illustrates an example process flow for operation of the illustrated system. For example, at block 170, an authorized user may be detected. For example, the camera device 110 may be activated. The camera device 110 may stream some or all of a live video feed 160, or captured images, to one or more remote servers for facial recognition processing. In some embodiments, the camera device 110 may perform some or all aspects of facial recognition processing locally. The camera device 110 may receive an indication, or may otherwise determine, that the deliveryman is an authorized user. In other embodiments, the deliveryman may authenticate via a cellular-connected handheld terminal.

At block 180, the camera system 110 may send a command to unlock the door using an external radio, or the wireless communication component 130 that is integrated in the power cord 120. The camera system 110 may communicate with the wireless communication component 130 through a universal asynchronous receiver/transmitter over one or more wires in the power cord 120. For example, the camera system 110 may communicate with the wireless communication component 130 over a five micro-USB wires. The wireless communication component 130 integrated in the power cord 120 may receive instructions from the camera system 110 and may send the command to the electronic door lock 140. In embodiments where the wireless communication component 130 is a ZigBee radio, the camera system 110 may send the unlock command to the electronic door lock 140 using the ZigBee radio. In some embodiments, the camera device 110 may include a controller configured to cause the unlock command to be sent from the ZigBee radio at the power cord 120.

At block 190, the electronic door lock 140 may receive the unlock command from the wireless communication component 130 or the ZigBee radio, and may unlock the door. The deliveryman may enter the residence or other building and may deliver the package. As a result, unattended delivery of packages is accomplished using, in one example, the illustrated embodiment.

Example embodiments of the disclosure provide a number of technical features or technical effects. For example, in accordance with example embodiments of the disclosure, certain embodiments of the disclosure may position one or more wireless communication components external to an electronic device and create separation between the external wireless communication component and any wireless communication components internal to the electronic device. As a result, certain embodiments may reduce potential interference between the external and internal wireless communication components. Data transmission rates may be improved, data packet errors and transmission errors may be reduced, and functionality of the electronic device may be improved, due to the additional functionality provided by the external wireless communication component that may be integrated into a power cord for the electronic device. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
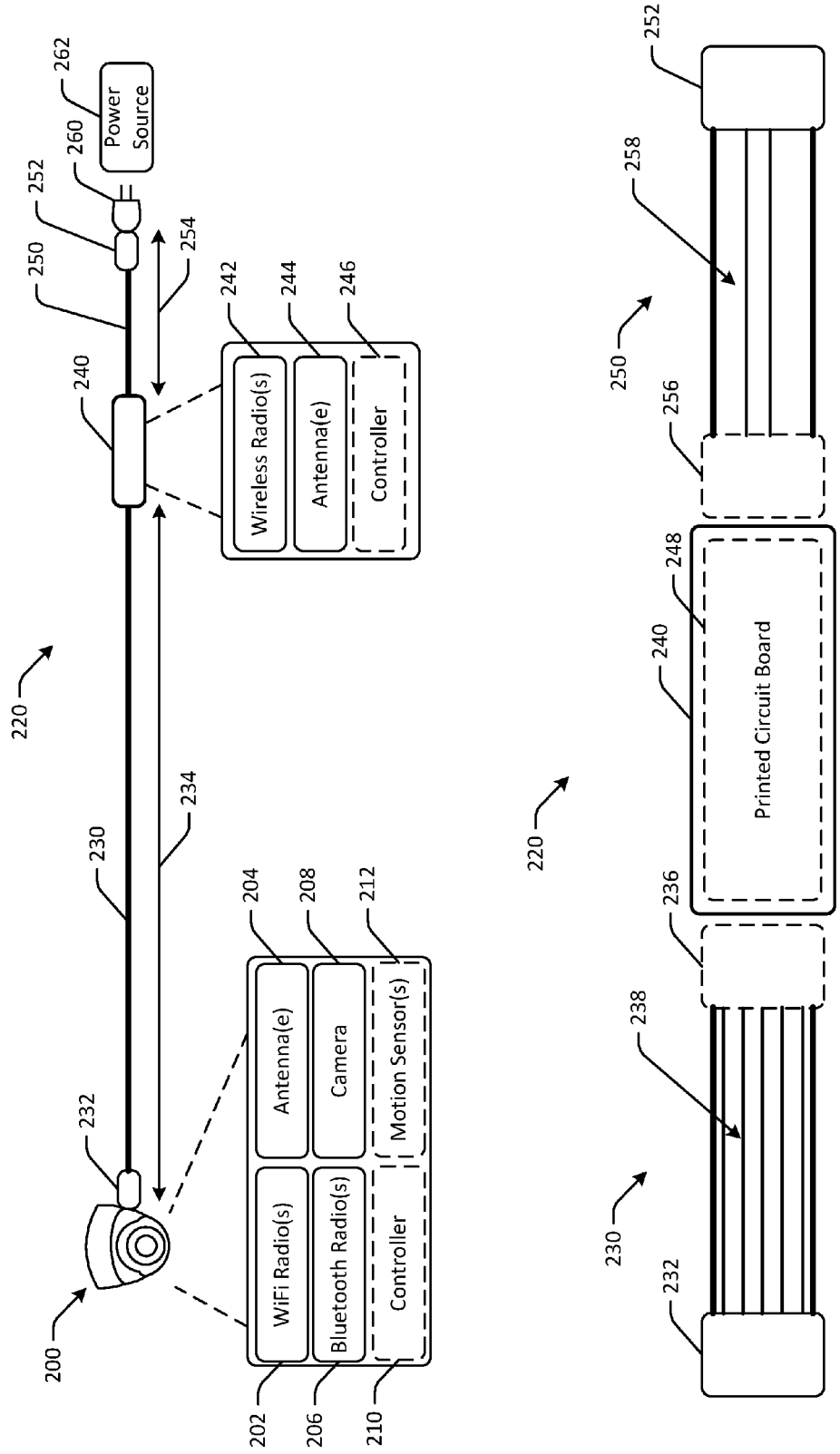
FIG. 2 is a schematic drawing of a power cable with an integrated wireless communication component in communication with an electronic device in accordance with one or more embodiments of the disclosure.

Referring to FIG. 2, a schematic drawing of an electronic device 200 coupled to a power cable 220 with an integrated wireless communication component 230 is depicted in accordance with one or more embodiments of the disclosure.

The electronic device 200 may be any electronic device, such as a camera device, a mobile device, a television device, a speaker device, a wearable device, or another device. In FIG. 2, the electronic device 200 may be a camera. The camera 200 may include one or more WiFi radios 202, one or more antenna(e) 204, one or more Bluetooth or Bluetooth LE radios 206, one or more cameras 208, one or more optional controllers 210, and one or more optional motion sensors 212. The WiFi radio 202 and the Bluetooth radio 206, in conjunction with the antenna 204, may create radio interference about the camera 200. For example, radio frequency sensitivity of either or both the WiFi radio 202 and the Bluetooth radio 206 may be reduced. Any other radios, particularly radios that operate at similar or the same frequency as either the WiFi radio 202 or the Bluetooth radio 206 may be negatively affected by electronic interference generated by components of the camera 200. In some embodiments, the electronic device 200 may include at least two internal wireless devices, such as the WiFi radio 202 and the Bluetooth radio 206, or any other wireless devices. Other embodiments may include one or more wireless communication devices.

The camera 200 may be coupled to the power cable 220. The power cable 220 may include a first portion 230, an integrated radio module 240, and a second portion 250. The integrated radio module 240 may be positioned between the first portion 230 and the second portion 250 of the power cable 220.

The camera 200 may be removably connected to the power cable 220. For example, at one end of the first portion 230, the power cable 220 may have a first connector 232. The first connector 232 may be any suitable connector, such as a USB connector, a micro-USB connector, or another connector. The camera 200 may have a port that corresponds to the first connector 232. For example, the camera 200 may include a USB port, a micro-USB port, or another suitable port. In some embodiments, the power cable 220 may be permanently attached to the camera 200.

The power cable 220 may be coupled to a wall adapter 260 at an end. The wall adapter 260 may be configured to engage a power source 262, such as a power outlet, a battery, or another power source. To removably connect to the wall adapter, the second portion 250 of the power cable may include a second connector 252. The second connector 252 may be configured to engage the wall adapter 260. For example, the second connector 252 may be any suitable connector, such as a USB connector, a micro-USB connector, or another connector. The wall adapter 260 may have a port that corresponds to the second connector 252. For example, the wall adapter 260 may include a USB port, a micro-USB port, or another suitable port. In some embodiments, the power cable 220 may not include the second connector 252 and/or the second connector 252 may be configured to directly engage a power source.

The first portion 230 of the power cable 220 may have a first length 234, and the second portion 250 may have a second length 254. The first portion 230 may be coupled to the electronic device or camera 200, and the second portion 250 may be coupled to the power source 262. The first length 234 may be greater than the second length 254 in some embodiments. Specifically, the integrated radio module 240 may be closer to the power source 262 than to the electronic device 200. In some embodiments, where the first length 234 is sufficiently long, such as at least about 6" or at least about 1 meter, the first length 234 may be the same as the second length 254. As a result, interference from the internal wireless devices of the electronic device 200 at the integrated radio module 240 may be reduced or eliminated.

The integrated radio module 240 may include one or more wireless radios 242, one or more antenna(e) 244, and one or more optional controllers 246. The components may be coupled to a printed circuit board 248 or another substrate. The first portion 230 may be permanently or removably coupled (e.g., detachable) to the integrated radio module 240. For example, the first portion 230 may include an optional third connector 236, such as a micro-USB connector, that is configured to removably attach (e.g., detachable) to one or more ports at the integrated radio module 240. Similarly, the second portion 250 may include an optional fourth connector 256, such as a USB connector that is configured to removably attach to one or more ports at the integrated radio module 240. In one embodiment, the first portion 230 may be coupled to one end of the printed circuit board 248 or one end of the integrated radio module 240, and the second portion 250 may be coupled to another end, such as an opposite end, of the printed circuit board 248 or integrated radio module 240. In other embodiments, the first portion 230 and/or the second portion 250 may be soldered or otherwise permanently attached to the printed circuit board 248. In some embodiments, portions 230 and/or 250 may serve as or augment antenna(e) 244.

The integrated radio module 240 may be configured to send and/or receive wireless communications. For example, the wireless radio 242 may be used in conjunction with the antenna 244 to send and/or receive data. In one embodiment, the wireless radio 242 may be a ZigBee radio that can be used in conjunction with the antenna 244 to send and/or receive data over a ZigBee network. The integrated radio module 240 may be a ZigBee radio module in some embodiments.

In some embodiments, the integrated radio module 240 may communicate with the electronic device 200 using one or more wires in the first portion 230 of the power cable 200. For example, the integrated radio module 240 may receive instructions and/or other data from the coupled electronic device 200. To send and/or receive data to and from the electronic device 200, and to power the electronic device 200, the first portion 230 of the power cable 220 may include a first set of wires 238.

The first portion 230 of the power cable 220 may include the first set of wires 238. The first set of wires 238 may be a set of at least five wires. Other embodiments may include additional or fewer, or different, wires. One or more, or each, of the five wires 238 may have the first length 234. Some or all of the five wires 238 may be soldered to the printed circuit board 248. The first set of wires 238 may include a power wire configured to direct current, a ground wire configured to ground the circuit, a data plus wire, a data minus wire, and an identifier or ID wire. The data plus wire and the data minus wire may be a twisted pair and may be a differential line. The data plus wire and the data minus wire may be used to send and/or receive data between the electronic device 200 and the integrated radio module 240. The integrated radio module 240 may thereby communicate with the electronic device 200 through the first portion 230 of the power cable 220. The ID wire may be used to indicate the availability of the integrated radio module 240, as described below. The five wires 238 may extend between the first connector 232 and the optional third connector 236 and/or the printed circuit board 248. Other embodiments may use low speed single-ended operation, such as universal transmit or receive, or other communication protocols and/or hardware.

The second portion 250 of the power cable 220 may include a second set of wires 258. The second set of wires 258 may be a set of two wires. Other embodiments may include additional or fewer, or different, wires. One or more, or each, of the two wires 258 may have the second length 254, which may be less than the first length 234. Some or all of the two wires 238 may be soldered to the printed circuit board 248. The second set of wires 258 may include a power wire configured to direct current and a ground wire configured to ground the circuit. The two wires 258 may extend between the second connector 252 and the optional fourth connector 256 and/or the printed circuit board 248. The first set of wires 238 may include wires that are at least partially different than the second set of wires 258. For example, the first set of wires may include the data plus and data minus wires, while the second set of wires 258 may not include the data plus and data minus wires. In some embodiments, the first portion 230 and the second portion 250 may include one or more data communication wires that may be used by, for example, the radio module or a connected electronic device to detect a charging scheme or charging capabilities of a charger at the wall adapter 260.

In some embodiments, the second set of wires 258 may have fewer wires than the first set of wires 238. For example, in FIG. 2, the second set of wires 258 may not include the data plus and data minus wires, as, in some embodiments, no data is sent between the power source 262 and the integrated radio module 240. As a result, costs associated with the power cable 220 may be reduced. In other embodiments, the data plus and data minus wires may be included in the second portion 250, such that data can be communicated with a power source such as a computer or laptop device.

Figure 3:
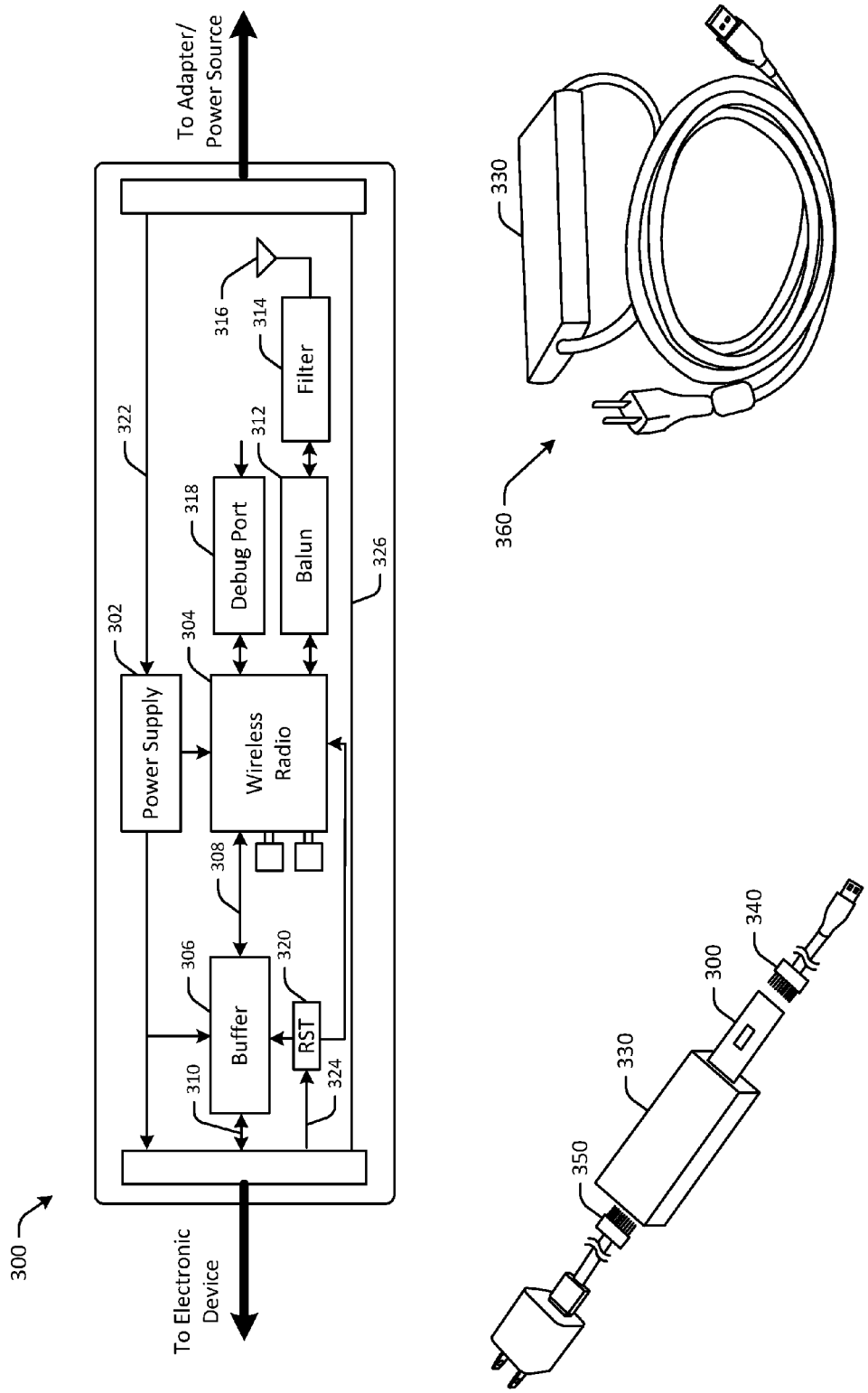
FIG. 3 is a schematic drawing of an integrated radio module and various example embodiments of power cables with integrated wireless communication components in accordance with one or more embodiments of the disclosure.

FIG. 3 is a schematic drawing of an integrated radio module 300 and various example embodiments of power cables with integrated wireless radios in accordance with one or more embodiments of the disclosure. The integrated radio module 300 may be the same wireless communication component of FIG. 1 and/or the integrated radio module of FIG. 2. The integrated radio module 300 may be coupled to a power source and an electronic device. In some embodiments, some or all current flowing from the power source 262 may be routed through the integrated radio module 240 before reaching the electronic device 200. The integrated radio module 300 may include one or more components that may be mounted on or otherwise attached to a substrate, such as a printed circuit board.

The integrated radio module 300 may include a power supply 302. The power supply 302 may be a switched-mode power supply and/or may include a switching regulator in some embodiments. The power supply 302 may be configured to have relatively low inline series resistance, in order to prevent voltage dropout at the electronic device. In another embodiment, voltage may be passed through from an adapter or power source to the device, and the printed circuit board may have a low resistance design that causes no or minimal voltage drop across the module 300, and the power supply 302 may tap into the pass through the power lines. Specifications for the power supply 302 may be determined based at least in part on the electronic device to which the integrated radio module 300 is coupled. The power supply 302 may be configured to manage alternating or direct current and to support pulse width modulation. The power supply 302 may be configured to step voltage up and/or down in some embodiments.

The integrated radio module 300 may include one or more wireless radios 304. The wireless radio 304 may be external to any electronic device to which the integrated radio module 300 is coupled. The wireless radio 304 may be any type of wireless radio, such as a ZigBee radio, a Bluetooth or Bluetooth LE radio, a Z-wave radio, a WiFi radio, or another wireless radio. The wireless radio 304 may be a fully integrated System-on-Chip and may use, for example, a 2.4 GHz, IEEE 802.15.4-2003-compliant transceiver. The wireless radio 304 may include a microprocessor, flash and RAM memory, and peripherals. The wireless radio 304 may draw power from the USB power path. The USB power path may be passed onto the electronic device.

The wireless radio 304 may be a system-on-chip. The wireless radio 304 may include on-chip peripherals such as optional USB, universal asynchronous receiver/transmitter, serial peripheral interface, two wire interface, analog-to-digital converter, and other timers, as well any number of general-purpose input/outputs.

The integrated radio module 300 may include one or more buffers 306. The buffer 306 may protect against over-current conditions or other issues with non-compatible electronic devices. The buffer 306 may also protect one or more of the wireless radio(s) 304 and the electronic device components from voltage transient on the power cable 360. The illustrated architecture can be used so as to allow the integrated radio module 300 to appear as if it is an internal hardware component of the electronic device to which the power cord 360 is connected. However, while appearing as an internal component, the integrated radio module 300 is external to the electronic device, which creates separation between the integrated radio module 300 and any other internal wireless components, thereby reducing potential interference.

The buffer 306 may be a tri-state buffer. A tri-state buffer has two inputs: a data input and a control input. When the control input is active, the output of the tri-state buffer may be equal to the input. When the control input is not active, the output may be a high impedance state output. A tri-state buffer may be configured to generate three state outputs. For example, the buffer 306 may be configured to output a value of one or more of: (i) 0; (ii) 1; or (iii) high impedance. The 0 and 1 outputs may be logic values, whereas a high impedance state may effectively remove the output from the circuit. High impedance may imply a resistance of about 5 megaohms, or greater than or equal to about 5 megaohms, or another value. The tri-state buffer 306 may allow multiple circuits to share the same output line or lines.

The integrated radio module 300 may include a universal asynchronous receiver/transmitter interface 308 configured to direct data between the integrated radio module 300 and a connected electronic device. In some embodiments, the universal asynchronous receiver/transmitter interface 308 may interface between the wireless radio 304 or another component of the integrated radio module 300 and data plus/data minus wires or Tx and Rx wires 310 coupled to the integrated radio module 300. The universal asynchronous receiver/transmitter interface 308 may be passed through the buffer 306 and onto the power cable or the data plus/data minus wires or Tx/Rx wires 310 of the power cable. Similarly, incoming data from a connected electronic device may be passed through the buffer 306 and the universal asynchronous receiver/transmitter interface 308. For example, the wireless radio 304 may be a ZigBee radio module that is configured to send data to an electronic device, such as a camera, through the data plus wire and the data minus wire or Tx/Rx wires 310 using a universal asynchronous receiver/transmitter. The electronic device to which the power cable is coupled may include a second universal asynchronous receiver/transmitter that can be used to communicate with the first universal asynchronous receiver/transmitter of the integrated radio module 300.

The integrated radio module 300 may include one or more balun components 312. The balun 312 may be a ceramic balun. The balun 312 may be an impedance transformer and may be configured to connect a balanced transmission line circuit to an unbalanced transmission line circuit. The balun 312 may include an impedance matching network, a balun transformer, and/or a filter.

The balun 312 may be coupled to a filter 314. The filter 314 may be configured to match input and output impedance values. The filter 314 may be an inductor-capacitor matching filter and may be configured to modify impedance so as to encourage maximum signal power transfer from a signal source to a load termination. In some embodiments, the filter 314 may be integrated with the balun 312.

The filter 314 may be coupled to one or more antenna(e) 316. For example, the integrated radio module 300 may include a printed circuit board antenna that is printed on the printed circuit board itself. In some embodiments, antenna (e) 316 might be conductors contained within cabling between the electronic device or power source and the integrated radio module 300. The integrated radio module 300 may include one or more debug ports 318. The debug port 318 may be configured to program one or more on-board memory devices. The debug port 318 may receive an incoming voltage.

The integrated radio module 300 may include a reset pin 320. The reset pin 320 may be in communication with an ID pin or ID wire 324, or another fifth wire or ID pin, of the cable between the integrated radio module 300 and a connected electronic device. The ID wire 324 may be used to provide a detection scheme for a connected electronic device. In addition, an electronic device connected to the integrated radio module 300 may remotely reset the entire integrated radio module 300. The ID pin or reset pin 320 may be pulled high, while a corresponding ID pin on the connected electronic device side may have a weak pull-down. Pulled high may indicate that resistance at the reset pin 320 is relatively less than resistance at the ID pin on the connected electronic device. Conversely, weak pull-down may indicate that resistance at the ID pin on the connected electronic device is relatively higher than resistance at the reset pin 320. To be pulled up, the reset pin 320 may be connected to a high voltage wire 322 at the integrated radio module 300. A corresponding ground wire 326 may also be included. The ID pin at the electronic device may have a weak pull-down by connecting the ID pin to ground. For example, a connected camera device may include an ID pin with a second resistance value that is greater than a first resistance value at the reset pin 320. Other configurations may be used.

The ID pin state with the weak pull-down at the connected electronic device may keep one or more front end buffers at the connected electronic device in a tri-stated condition. Tri-stated condition may be a high impedance state. As a result, the input signal from the integrated radio module 300 to the electronic device may be maintained in an inactive logic high state. The strong pull-up, or the pulled-high, condition of the reset pin 320 may maintain the buffer 360 in a tri-stated, or high impedance, condition. As a result, the integrated radio module 300 may be held in reset. Being held in reset may prevent the integrated radio module 300 from becoming active if it is connected to a power source before being connected to an electronic device (e.g., one end of the power cable is plugged into a power source before the other end of the power cable is connected to an electronic device, etc.). Example operation is described with reference to FIG. 4.

The integrated radio module 300 may be integrated into a power cord 360 for an electronic device. For example, the integrated radio module 300 may be positioned in a housing 330. The housing 330 may be any suitable enclosure. In some embodiments, the housing 330 may be an overmolding or a portion of an outer layer of a power cord. The integrated radio module 300 may interface with a first connector 340 or a first component that may connect to an electronic device. The integrated radio module 300 may interface with a second connector 350 or a second component that may connect to a power source. As illustrated in FIG. 3, the integrated radio module 300 may be detachable from one or both the electronic device and the power source. For example, the power cord 360 can be detached and coiled up, or used with another electronic device to improve the functionality of another electronic device. Operation of the integrated radio module 300 or one or more components of the integrated radio module 300 may be controlled by the electronic device connected to the power cord 360, or by the integrated radio module 300 itself.

Figure 4:
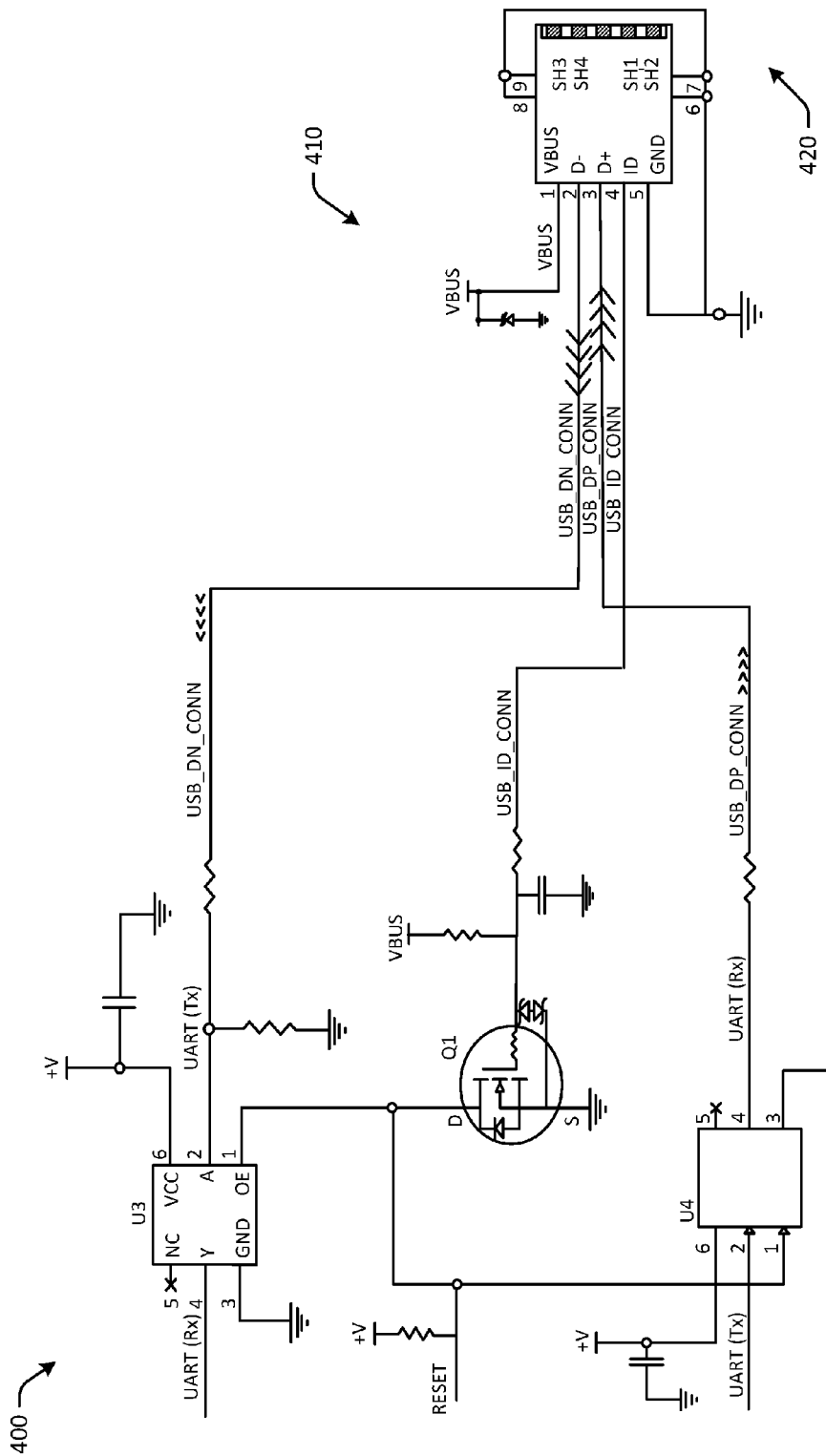
FIG. 4 is a schematic drawing of an integrated radio module interface circuit in accordance with one or more embodiments of the disclosure.

FIG. 4 is a schematic drawing of an integrated radio module interface circuit 400 in accordance with one or more embodiments of the disclosure. Some or all of the integrated radio module circuit 400 may be the circuitry of the integrated radio module of FIG. 3. The integrated radio module circuit 400 may illustrate circuitry when an electronic device is coupled to, for example, the integrated radio module of FIG. 3, and may include a detection circuit. The integrated radio module circuit 400 may include an integrated radio module facing portion 410 and a connected electronic device facing portion 420.

The electronic device may have a universal asynchronous receiver/transmitter (UART) transmission line (Tx) and receiving line (Rx). One or more isolation buffers may be used with the UART Tx and UART Rx lines. The strong pull-up on the reset pin of the integrated radio module circuit 400 will overcome the weak pull-down on the ID pin of the electronic device. As a result, one or more components may be powered and the input signal from the integrated radio module circuit 400 to the electronic device may be forced from logic 1 to 0, indicating that the integrated radio module circuit 400 is plugged in and/or connected to the electronic device.

The integrated radio module circuit 400 may include one or more tri-state buffers (U3, U4) that may remain in a high impedance state until the electronic device's software activates the output signal from the electronic device to the integrated radio module circuit 400 from logic 0 to 1. The tri-state buffer(s) at the electronic device may also remain in a high impedance state until the electronic device's software activates the output signal. A circuit similar to that illustrated in FIG. 4 may be included at the device side which inverts the logic described with respect to FIG. 4.

When the electronic device activates the output signal (ID) from the electronic device to the integrated radio module circuit 400 from 1 to 0, certain functions may occur or be performed at the electronic device. One or more of the tri-state buffers at the electronic device may become active and one or more components at the electronic device may be powered on. Since the shared (ID) signal from the integrated radio module circuit 400 to the electronic device also indicates the presence of the radio module, it may be ignored after the detection phase is completed, and may revert to an output signal from the electronic device. Once changed to an output signal from the electronic device, the output signal may be used to take the radio module out of a reset mode by transitioning the ID signal from 1 to 0. The software at the electronic device may know that the power cord with the integrated radio module circuit 400 is plugged in after the detection phase, and may take the radio module out of reset mode.

At the integrated radio module circuit 400, when the electronic device activates the output signal from the electronic device to the integrated radio module circuit 400 from 1 to 0, certain functions may occur or be performed. The tri-state buffers U3 and U4 may be taken out of high impedance mode, and the integrated radio module circuit 400 may be taken out of a reset state using Q1. The output signal from the electronic device to the integrated radio module circuit 400 transitions from logic 1 to logic 0. The integrated radio module circuit 400 module software may boot up and communication between the integrated radio module circuit 400 and the electronic device may commence using the UART TX and RX signals.

This is distinct from functions that may occur when a power cable without an integrated radio module is connected to the electronic device. In instances where a power cable without an integrated radio module is connected to the electronic device, the input signal (ID) from the cable to the electronic device would be non-existent or shorted to ground, so the input signal would remain low at the electronic device.

Figure 5:
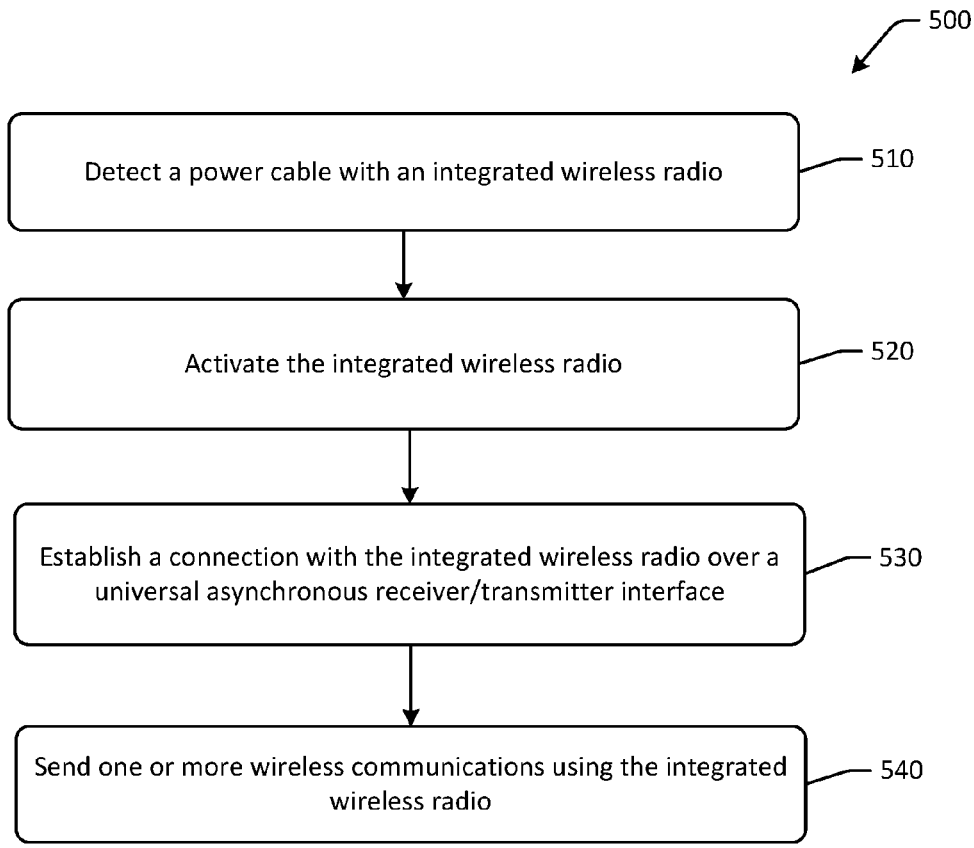
FIG. 5 is an example process flow for wireless communications using a power cable with an integrated wireless communication component in accordance with one or more embodiments of the disclosure.

FIG. 5 is an example process flow 500 for wireless communications using a power cable with an integrated wireless radio in accordance with one or more embodiments of the disclosure. Although certain operations are illustrated as occurring separately in FIG. 5, some or all of the operations may occur concurrently or partially concurrently across one or more computer systems, and may occur in any order, or in the illustrated order. Other embodiments may include additional or fewer operations.

At block 510 of the process flow 500, a power cable with an integrated wireless radio is detected. At block 520, the integrated wireless radio is activated. At block 530, a connection to the integrated wireless radio is established over a UART interface. At block 540, one or more wireless communications are sent using the integrated wireless radio. The one or more wireless communications may be sent as or with instructions or commands from an electronic device to the integrated wireless radio over the UART interface.

One or more operations of the method, process flows, or use cases of FIGS. 1-5 may have been described above as being performed by a user device, or more specifically, by one or more program module(s), applications, or the like executing on a device. It should be appreciated, however, that any of the operations of methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
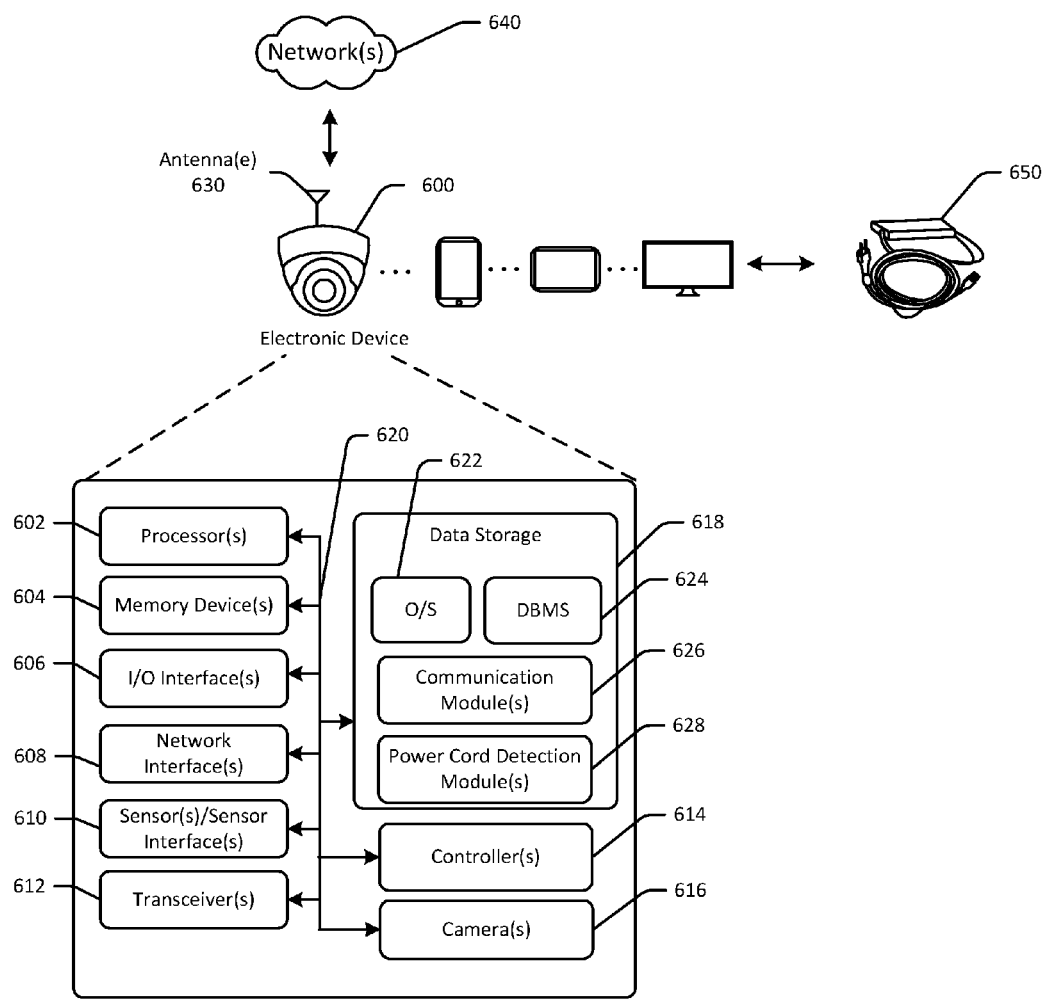
FIG. 6 schematically illustrates an example architecture of a system in accordance with one or more embodiments of the disclosure.

FIG. 6 is a schematic block diagram of one or more illustrative electronic device(s) 600 in accordance with one or more example embodiments of the disclosure. The electronic device(s) 600 may include any suitable computing device including, but not limited to, a server system, a camera or camera system, a mobile device such as a smartphone, a tablet, an e-reader, a wearable device, or the like; a desktop computer; a laptop computer; a content streaming device; a set-top box; or the like. The electronic device(s) 600 may correspond to an illustrative device configuration for the electronic device(s) of FIGS. 1-5.

The electronic device(s) 600 may be configured to communicate via one or more networks with one or more servers, user devices, or the like. The electronic device(s) 600 may be configured to control wireless communications using wireless radios that are integrated into power cords as described herein, or send and receive information using the external wireless radios. The electronic device(s) 600 may be configured to detect users, perform facial recognition, send and receive wireless communications, control operations of remote devices, such an internet of things devices, and other operations.

The electronic device(s) 600 may be coupled to one or more power cables 650 that include integrated wireless radios. The electronic device(s) 600 may be in wired or wireless communication with the integrated wireless radio of the power cable 650 and may use the wireless radio to send and receive instructions, communications, and the like.

The electronic device(s) 600 may be configured to communicate via one or more networks 640. Such network(s) 640 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 640 may have any suitable communication range associated therewith and may include, for example, global networks (e.g., the Internet), metropolitan area networks (MANs), wide area networks (WANs), local area networks (LANs), or personal area networks (PANs). In addition, such network(s) 640 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC)

medium, a microwave medium, a radio frequency communication medium, a satellite communication medium, or any combination thereof.

In an illustrative configuration, the electronic device(s) 600 may include one or more processors (processor(s)) 602, one or more memory devices 604 (generically referred to in this section as memory 604), one or more input/output ("I/O") interface(s) 606, one or more network interface(s) 608, one or more sensors or sensor interface(s) 610, one or more transceivers 612, one or more controllers 614, one or more cameras 616, and data storage 618. The electronic device(s) 600 may further include one or more buses 620 that functionally couple various components of the electronic device(s) 600. The electronic device(s) 600 may further include one or more antenna(e) 630 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 620 may include at least one of a system bus, a memory bus, an address bus, or a message bus, and may permit the exchange of information (e.g., data (including computer-executable code), signaling, etc.) between various components of the electronic device(s) 600. The bus(es) 620 may include, without limitation, a memory bus or a memory controller, a peripheral bus, an accelerated graphics port, and so forth. The bus(es) 620 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the electronic device(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 618 may include removable storage and/or non-removable storage including, but not limited to, magnetic storage, optical disk storage, and/or tape storage. The data storage 618 may provide non-volatile storage of computer-executable instructions and other data. The memory 604 and the data storage 618, removable and/or non-removable, are examples of computer-readable storage media (CRSM) as that term is used herein.

The data storage 618 may store computer-executable code, instructions, or the like that may be loadable into the memory 604 and executable by the processor(s) 602 to cause the processor(s) 602 to perform or initiate various operations. The data storage 618 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to data storage 618 for non-volatile storage.

More specifically, the data storage 618 may store one or more operating systems (O/S) 622; one or more database management systems (DBMS) 624; and one or more program module(s), applications, engines, computer-executable code, scripts, or the like such as, for example, one or more communication module(s) 626 and/or one or more power cord detection module(s) 628. Some or all of these module(s) may be or include sub-module(s). Any of the components depicted as being stored in data storage 618 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 618 may support the functionality described in reference to the corresponding components named earlier in this disclosure.

The data storage 618 may further store various types of data utilized by the components of the electronic device(s) 600. Any data stored in the data storage 618 may be loaded into the memory 604 for use by the processor(s) 602 in executing computer-executable code. In addition, any data depicted as being stored in the data storage 618 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, an example datastore(s) may include, for example, user account data, user device settings, user device preferences and authorizations, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the electronic device(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), Image Signal Processor (ISP), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the communication module(s) 626 may include computer-executable instructions, code, or the like that responsive to execution by one or more of the processor(s) 602 may perform functions including, but not limited to, communicating with remote servers or devices, communicating with remote datastores, communicating with local servers or devices on an intranet, sending or receiving information and instructions, and the like.

The power cord detection module(s) 628 may include computer-executable instructions, code, or the like that responsive to execution by one or more of the processor(s) 602 may perform functions including, but not limited to, identifying signal values, determining buffer states, determining signal values, detecting radio modules, detecting external radio modules, and the like.

Referring now to other illustrative components depicted as being stored in the data storage 618, the O/S 622 may be loaded from the data storage 618 into the memory 604 and may provide an interface between other application software executing on the electronic device(s) 600 and the hardware resources of the electronic device(s) 600. More specifically, the O/S 622 may include a set of computer-executable instructions for managing the hardware resources of the electronic device(s) 600 and for providing common services to other application programs (e.g., managing memory allocation among various application programs). In certain example embodiments, the O/S 622 may control execution of the other program module(s) to dynamically enhance characters for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 618. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 600 is a mobile device, the DBMS 624 may be any suitable light-weight DBMS optimized for performance on a mobile device.

Referring now to other illustrative components of the electronic device(s) 600, the input/output (I/O) interface(s) 606 may facilitate the receipt of input information by the electronic device(s) 600 from one or more I/O devices as well as the output of information from the electronic device(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), micro-USB, FireWire, Thunderbolt, Ethernet port or other connection protocol that may connect to one or more networks. The I/O interface(s) 606 may also include a connection to one or more of the antenna(e) 630 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, a WiMAX network, a 3G network, a ZigBee network, etc.

The electronic device(s) 600 may further include one or more network interface(s) 608 via which the electronic device(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(e) 630 may include any suitable type of antenna depending, for example, on the communications protocols used to transmit or receive signals via the antenna(e) 630. Non-limiting examples of suitable antennae may include directional antennae, non-directional antennae, dipole antennae, folded dipole antennae, patch antennae, multiple-input multiple-output (MIMO) antennae, or the like. The antenna(e) 630 may be communicatively coupled to one or more transceivers 612 or radio components to which or from which signals may be transmitted or received.

As previously described, the antenna(e) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 630 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 630 may be configured to transmit or receive radio frequency signals within any suitable frequency range forming part of the unlicensed portion of the radio spectrum.

The antenna(e) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System. Similarly, the power cable 650 may include one or more antenna(e), such as a ZigBee antenna, that may be the same or different than the antenna(e) of the electronic device(s) 600.

The transceiver(s) 612 may include any suitable radio component(s) for—in cooperation with the antenna(e) 630—transmitting or receiving radio frequency (RF) signals in the bandwidth and/or channels corresponding to the communications protocols utilized by the electronic device(s) 600 to communicate with other devices. The transceiver(s) 612 may include hardware, software, and/or firmware for modulating, transmitting, or receiving—potentially in cooperation with any of antenna(e) 630—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the electronic device(s) 600. The transceiver(s) 612 may further include a low noise amplifier (LNA), additional power signal amplifiers (PA), an analog-to-digital (A/D) converter, one or more buffers, a digital baseband, or the like.

The controller(s) 614 may be any microcontroller or microprocessor configured to control one or more operations of the electronic device. The camera(s) 616 may be any suitable camera configured to generate images and/or videos of an ambient environment.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 6 as being stored in the data storage 618 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 600, and/or hosted on other computing device(s) accessible via one or more networks, may be provided to support the functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the electronic device(s) 600 may include alternate and/or additional hardware, software, or firmware components beyond those described or depicted without departing from the scope of the disclosure. More particularly, it should be appreciated that software, firmware, or hardware components depicted as forming part of the electronic device(s) 600 are merely illustrative and that some components may not be present or additional components may be provided in various embodiments. While various illustrative program module(s) have been depicted and described as software module(s) stored in the data storage 618, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms That which is claimed is:

1. A system comprising:
   a camera comprising a WiFi radio, a Bluetooth radio, and a micro-USB port; and
   a power cord configured to deliver power to the camera, the power cord comprising:
      a USB connector at a first end;
      a micro-USB connector removably at a second end;
      a ZigBee radio module disposed between the first end and the second end along a length of the power cord, the ZigBee radio module comprising a printed circuit board, a ZigBee radio positioned on the printed circuit board, and an antenna printed on the printed circuit board, wherein the ZigBee radio module is integrated into the power cord;
      a first set of wires having a first length, the first set of wires soldered to a first side of the printed circuit board and connected to the USB connector; and
      a second set of wires having a second length, the second set of wires soldered to a second side of the printed circuit board and connected to the micro-USB connector;
      wherein the second length is greater than the first length.

2. The system of claim 1, wherein the ZigBee radio module further comprises a universal asynchronous receiver/transmitter.

3. The system of claim 2, wherein the first set of wires comprises a power wire and a ground wire;
   wherein the second set of wires comprises a power wire, a ground wire, a data plus or electronic device receive wire, a data minus or electronic data transmit wire, and an ID wire; and
   wherein the ZigBee radio module is configured to communicate data to an external device using the universal asynchronous receiver/transmitter.

4. The system of claim 1, wherein the ZigBee radio module further comprises one or more tri-state buffers and a first ID pin comprising a first resistance value, the tri-state buffers configured to output a value of one or more of: (i) 0; (ii) 1; or (iii) high impedance of equal to or greater than about 5 megaohms; and
   wherein the camera further comprises a second ID pin having a second resistance value that is greater than the first resistance value in an inactive state.

5. A power cable comprising:
   a first portion comprising a first connector connected to a power source;
   a second portion comprising a second connector; and
   an integrated radio module comprising a ZigBee radio;
   wherein the integrated radio module is coupled between the first portion and the second portion, and wherein the integrated radio module is in a reset mode when the second connector is disconnected.

6. The power cable of claim 5, wherein the integrated radio module further comprises an antenna and a universal asynchronous receiver/transmitter.

7. The power cable of claim 5, wherein the second portion has a length that is greater than or equal to a threshold length; and
   wherein the integrated radio module is separated from the second connector by the length.

8. The power cable of claim 5, wherein the integrated radio module further comprises a pulled-up ID pin and one or more tri-state buffers configured to output a value of one or more of: (i) 0; (ii) 1; or (iii) high impedance.

9. The power cable of claim 5, wherein the power cable is coupled to a camera device comprising a first universal asynchronous receiver/transmitter; and
   wherein the integrated radio module further comprises a second universal asynchronous receiver/transmitter, the integrated radio module configured to communicate with the first universal asynchronous receiver/transmitter of the camera device using the second universal asynchronous receiver/transmitter.

10. The power cable of claim 5, wherein the second portion has a length of at least 6 inches and comprises one or more data communication wires.

11. The power cable of claim 5, wherein the integrated radio module further comprises an ID pin and one or more tri-state buffers, wherein the ID is pulled-up, such that resistance at the ID pin is relatively less than resistance at a corresponding ID pin on an electronic device connected to the second connector, and wherein the one or more tri-state buffers are in a high impedance state;
    wherein the first portion comprises a first set of wires having at least a power wire and a ground wire; and
    wherein the second portion comprises a second set of wires having a power wire, a ground wire, and one or more wires for data or ID communication.

12. The power cable of claim 5, wherein the integrated radio module is configured to step voltage up, maintain, or step voltage down between the first portion and the second portion.

13. The power cable of claim 5, wherein the first portion comprises a first power wire, and wherein the second portion comprises a second power wire connected to the first power wire, and wherein integrated radio module is connected to the first power wire and the second power wire in parallel.

14. The power cable of claim 5, wherein the first portion of the power cord is detachable from the integrated radio module, and the second portion of the power cord is detachable from the integrated radio module.

15. The power cable of claim 5, wherein the first connector is a USB connector, and the second connector is a micro-USB connector.

16. The power cable of claim 5, wherein the integrated radio module further comprises a printed circuit board, an antenna, and one or more buffers; and
    wherein the wireless radio, the antenna, and the one or more buffers are mounted on the printed circuit board.

17. A system comprising:
    an electronic device comprising at least one internal wireless radio;
    a power cord coupled to a power source and the electronic device, the power cord comprising an integrated wireless radio that is positioned external to the electronic device, wherein the power cord comprises a first portion with first wires and a second portion with second wires, and wherein the second portion is longer than the first portion; and wherein the integrated wireless radio is positioned between the first portion and the second portion.

18. The system of claim 17, wherein the integrated wireless device is a ZigBee radio configured to communicate with the electronic device through the second portion of the power cord;
wherein the second portion is longer than a threshold length.

19. The system of claim 17, wherein the electronic device is configured to control operation of the integrated wireless radio using the second portion of the power cord.

20. The system of claim 17, wherein the integrated wireless radio further comprises a pulled-up ID pin and one or more tri-state buffers configured to output a value of one or more of: (i) 0; (ii) 1; or (iii) high impedance.

* * * * *